T. Welch.
Harvester.
N° 78904. Patented Jun. 16, 1868.
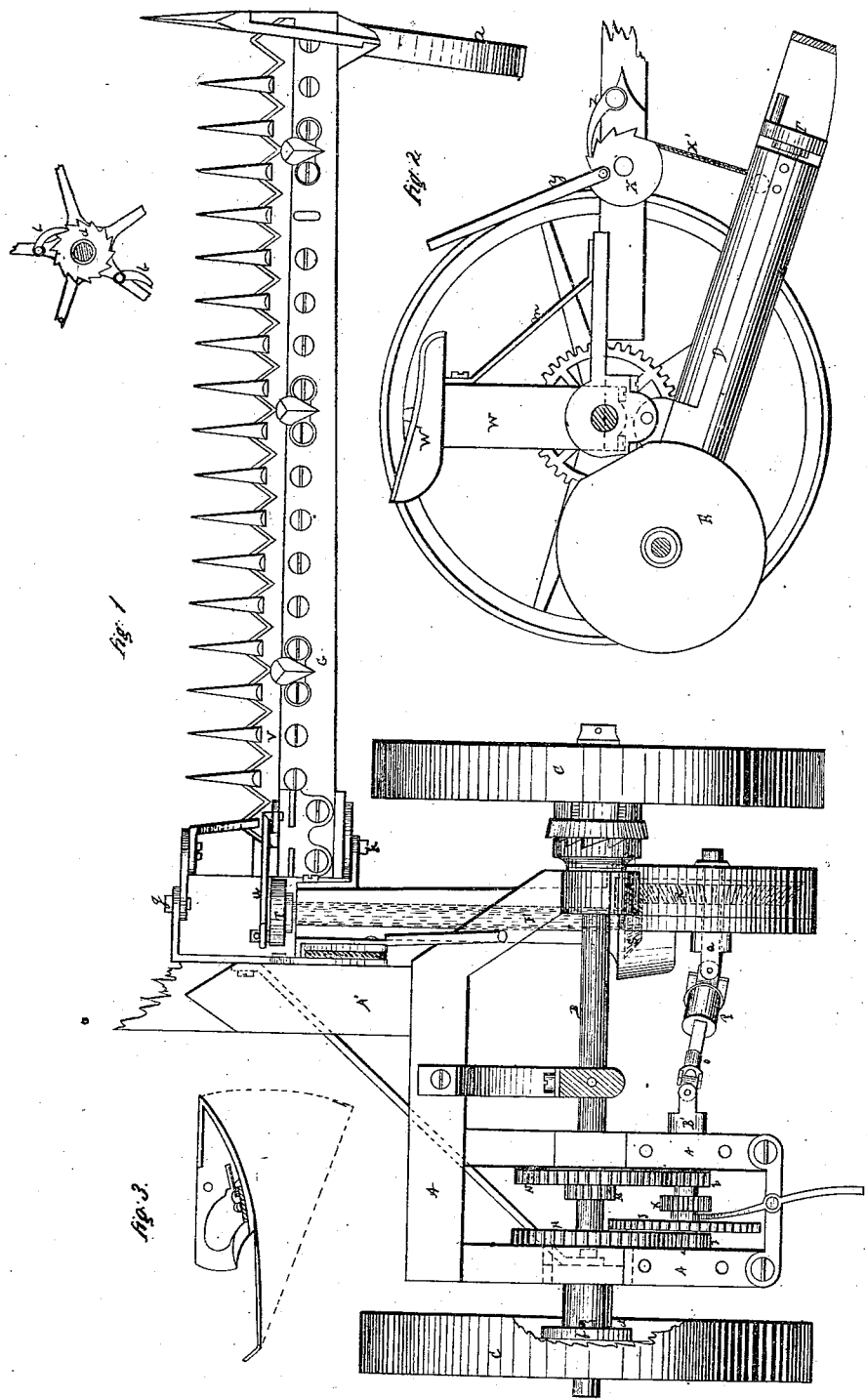

United States Patent Office.

THOMAS WELCH, OF CHURCHVILLE, NEW YORK.

Letters Patent No. 78,904, dated June 16, 1868.

IMPROVEMENT IN HARVESTERS.

The Schedule referred to in these Letters Patent and making part of the same.

TO ALL WHOM IT MAY CONCERN:

Be it known that I, THOMAS WELCH, of Churchville, in the county of Monroe, and in the State of New York, have invented certain new and useful Improvements in Mowing-Machines; and do hereby declare that the following is a full, clear, and exact description thereof, reference being had to the accompanying drawings, and to the letters of reference marked thereon.

In the annexed drawings, making part of this specification, A, B, and C represent respectively the frame, the axle, and the wheels of a two-wheeled mowing-machine, or combined reaper and mower.

The frame A, which is the frame of the machine, rests upon the axle B, and is provided on its under side with suitable bearings for the axle B, so that said axle may revolve, when desirable, without affecting the frame.

The wheels C C are fitted so as to run loosely upon the axle when the machine is backing, but so arranged that they will be connected rigidly to it when moving forward. In order to make this rigid connection, I employ two ratchet-wheels, $d$, one on each side of the frame, and made fast to it, and resting, when the wheels are in position, close to the inner ends of their hubs. $b\ b$ represent pawls, which are pivoted at one end to the spokes or arms of the driving-wheels. These pawls turn upon their pivots, and fall by their own gravity as the wheels revolve, so that their loose ends catch into the teeth of the ratchet-wheels $d$, and thus connect the wheels rigidly to the axle when the machine is moved forward. When the machine is backed, the pawls do not catch in the teeth of the wheels $d$, and said wheels then turn freely upon the axle.

Surrounding the main axle, B, are the two gear-wheels H and N, and the pinion M. The wheel H is secured permanently to the axle, while the wheel N and pinion M are loose upon it, but the wheel N and pinion M are secured permanently to each other, so that they always revolve together.

B' represents a jointed or flexible counter-shaft, which has two bearings in the frame A, near one end. Upon this shaft B' are two pinions, I and L, and a gear-wheel, J. The pinion L is permanently secured to this shaft, while the wheel J and pinion I, though secured permanently together, are not always permanent upon the shaft.

$e$ represents a lug or pin upon shaft B', which takes into a slot or opening in one side of pinion I, when it is desired to station it to the shaft.

K represents a flange upon the collar of the wheel J, and between this flange and the wheel is a groove, in which the forked end of a lever, $f$, catches, for the purpose of sliding the wheel J and pinion I upon the shaft B', so as to make them permanent or loose upon said shaft, as the nature of the case may demand.

The pinion I gears into the wheel H all the while, whether it be loose or not, being so arranged, and its cogs or teeth being of such width, that when it is moved from full gear with wheel H, and from contact with lug or pin $e$, it ceases to be permanent upon the shaft, but still gears or meshes sufficiently into wheel H to be driven by it, being now loose upon the shaft. In other words, when the pinion I is in full gear with wheel H, it is permanent upon the shaft B', but when not in full gear, and not caught by pin $e$, it is loose upon said shaft, but is nevertheless always driven by wheel H. The object of this arrangement of gearing just described is to give a reduced or accelerated motion to shaft B', and consequently to the knife, as the nature of the case may demand.

The reduced motion is given by throwing the pinion I into full gear with the wheel H. When a faster motion is required, I move the pinion I from contact with pin $e$, and so that wheel J will engage with the pinion M on shaft B.

Now, the pinion I and wheel J are loose, and so are pinion M and wheel N, while the wheel H and pinion L are permanent upon their respective shafts. When these pinions and wheels are geared and arranged in this manner, it is evident that the motion of the knife, through its various connections, (which will be hereinafter described,) will be much accelerated. The loose wheels and pinions run in the same direction that their shafts do, and thus almost entirely do away with friction.

G represents the finger-bar, which may be constructed in any of the well-known and usual ways, and which is hinged at its inner end to a vibrating-frame, D, in such a manner that, although the position of it be changed, still the pitman $u$ will work freely in driving the knife V, and cause it always to register the same. $g$ and $h$ represent the pivots, which form the hinge or connection of the finger-bar to the vibrating-frame.

The frame D consists of a metallic box, in which is encased a shaft, F, provided on one end with a bevel-pinion, and also a bevel-gear wheel, R.

This frame does not vibrate upon or around a gear-centre, but beneath it, being pivoted to the frame A beneath the axle B, which is the gear-centre. A brace, $j$, runs forward from the opposite side of frame A, to which the frame D is hung, in order to brace and strengthen the forward end of said frame. The flexible shaft B' is composed of four parts. To that portion of it which has its bearings in the frame A is connected, by a universal joint, a square shaft, $o$. This square shaft enters a sleeve, P, which is provided with a square opening made to receive it. One end of sleeve P is connected by a universal joint to a shaft, Q, which passes through and has its bearings in the vibrating-frame D.

When that end of frame D in which shaft Q is held rises or falls from any cause, the square shaft O draws partially out of or moves further into the sleeve P, but always preserving the connection. The universal joints in the shaft allow one end to change position without causing either end to bind in its bearings. Upon the shaft Q, and within the frame D, is secured a bevel-gear wheel, R. This gear-wheel meshes into the bevel-pinion S, upon the shaft F. The shaft F has its bearings in the frame D, its forward end projecting through the forward end of the frame, and being provided with a suitable crank. To the arm of this crank one end of the pitman U is attached, thus forming the connection to the knife V.

It will thus be seen that a slow or fast motion is transmitted from the gear-wheels first described through the flexible shaft B, bevel-wheel R, pinion S, shaft F, crank T, and pitman U, to the knife V, and that whether the finger-bar or the vibrating-frame D change position, rising or falling upon their pivots or hinges, still the motion and register of the knife always remain the same, and the shafts and gearing and pitman work freely, and without binding in any of their parts.

The outer end of the finger-bar is supported upon a runner, $a$, which extends out behind the bar some little distance, and has its rear end turned up. When the forward end of frame D is raised for the purpose of throwing the cutting-apparatus up, the outer end of the finger-bar is supported upon the heel of the runner. This runner relieves the finger-bar of a great deal of strain, and gives it steadiness of motion and strength.

The dotted line in Figure 3 describes the curve of the point of the shoe as it rises, and also illustrates how the weight of the bar is shifted to the heel of the runner.

W' represents the driver's seat, which is supported upon a standard, W, said standard being held in a vertical position by means of a brace, $m$. The shaft B passes through the lower end of this standard. The weight of the driver is thus thrown directly upon the axle B, and not upon the frame A.

X represents a ratchet-pulley, which is pivoted to the tongue of the machine. This pulley is provided with a lever-handle, $y$, and a cord, $x'$, runs from it down, and attaches to the forward end of the frame D. A pawl, $z$, catches into the teeth of this pulley, to station it when desirable.

By the use of this pulley and cord, the frame D and the finger-bar G are raised and lowered to suit the nature of the ground or the grain or grass to be cut. The tongue of the machine is made fast to the frame A.

It will be seen that I employ and need no means of making the joint of the finger-bar to the frame D rigid. This joint is always flexible. The runner $a$ compensates for a device making a rigid joint, and dispenses with the necessity of such a device, for it is evident that when the jointed end of the finger-bar is raised, the outer end also rises upon the runner as said runner changes from a horizontal toward a vertical position. It will also be observed that, let the finger-bar change position as it may, the angle of the pitman remains the same.

Having thus fully described my invention, what I claim as new, and desire to secure by Letters Patent, is—

1. A vibrating-gear and finger-bar frame in harvesters, in combination with a jointed counter-shaft, B', for the purpose set forth.

2. With a two-wheeled jointed-bar harvesting-machine, counter-shaft B', in combination with two frames, one being rigid and the other vibrating, said shaft running across, and having journals in each frame, in which it works freely in all variations of either frame, as set forth.

3. In a two-wheeled jointed-bar harvesting-machine, a triple gear, mounted upon two shafts, and meshing together, the wheels H, J, and N, with their pinions M, I, and L, representing said gear, the whole operating in the manner and for the purpose set forth.

In testimony that I claim the foregoing, I have hereunto set my hand, this 26th day of November, 1867.

THOMAS WELCH.

Witnesses:
C. M. ALEXANDER,
J. M. MASON.